United States Patent
Matsushiro et al.

(10) Patent No.: US 7,015,927 B2
(45) Date of Patent: Mar. 21, 2006

(54) IMAGE PROCESSING APPARATUS AND METHOD OF GENERATING COLOR MAPPING PARAMETERS

(75) Inventors: Nobuhito Matsushiro, Tokyo (JP); Yasushi Kobayashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 116 days.

(21) Appl. No.: 10/372,104

(22) Filed: Feb. 25, 2003

(65) Prior Publication Data
US 2003/0179212 A1 Sep. 25, 2003

(30) Foreign Application Priority Data
Mar. 19, 2002 (JP) .............................. 2002-076845

(51) Int. Cl.
*G09G 5/02* (2006.01)
(52) U.S. Cl. ...................................... 345/600; 345/589
(58) Field of Classification Search ................ 345/600, 345/603, 589
See application file for complete search history.

(56) References Cited

U.S. PATENT DOCUMENTS

| | | | | |
|---|---|---|---|---|
| 5,631,749 A | * | 5/1997 | Ueda ........................... | 358/520 |
| 5,809,366 A | | 9/1998 | Yamakawa et al. | |
| 5,909,220 A | * | 6/1999 | Sandow ....................... | 345/589 |
| 5,995,714 A | | 11/1999 | Hadley et al. | |
| 6,477,271 B1 | * | 11/2002 | Cooper et al. .............. | 382/167 |

FOREIGN PATENT DOCUMENTS

| | | |
|---|---|---|
| EP | 0 539 868 | 10/1992 |
| JP | 09-216386 | 8/1997 |

* cited by examiner

*Primary Examiner*—Sumati Lefkowitz
*Assistant Examiner*—Motilewa Good-Johnson
(74) *Attorney, Agent, or Firm*—Rabin & Berdo, PC (57) ABSTRACT

Parameters for mapping colors from an input system to an output system are determined by displaying a set of adjustment colors in the input system and outputting a reference color pattern in the output system. A human operator selects the reference colors most closely matching the adjustment colors. The mapping parameters are determined from the operator's selections, by table look-up or by use of a mathematical formula, for example. Accurate color mapping parameters can be generated in this way without the need for trial and error.

18 Claims, 8 Drawing Sheets

IMAGE PROCESSING APPARATUS AND METHOD OF GENERATING COLOR MAPPING PARAMETERS

BACKGROUND OF THE INVENTION

1. Field of the Invention

The present invention relates to an image processing method and apparatus, and more particularly to a method of selecting color mapping parameters.

2. Description of the Related Art

Conventional color image processing apparatus includes apparatus in which an image displayed by an input system, such as a cathode-ray-tube (CRT) monitor attached to a host computing device, is reproduced by an output system such as an electrophotographic printer or ink-jet printer. Such apparatus typically includes a printer driver, running as software on the host computing device, that can display images on the input system, as well as having images printed by the output system.

In this type of apparatus, the input system displays color images by additive color mixing of three primary colors, normally red, green, and blue (RGB), while the output system prints the same color images by subtractive color mixing of three or four different colors, generally including cyan, magenta, and yellow (CMY) and often also including black (CMYK). One result is that the gamut of colors reproducible by the output system usually differs from the gamut of colors reproducible by input system. When color images are converted from the input system to the output system, the conversion is effected by a mathematical mapping of RGB data to CMY or CMYK data. Ideally, all output colors should exactly match the corresponding input colors, but because of the different gamuts of reproducible colors, this is not in general possible. Moreover, since different printers employ different types of toner or ink, the mapping parameters need to be adjusted individually for each output system in order to obtain at least a reasonably close match between the input and output colors.

The adjustment is often carried out by having the operator of the host computing device enter and adjust the numerical values of the coefficients of the mathematical mapping functions, or the values of what are termed color mapping vectors. It is not easy, however, to intuit the effect of a change in these numerical values on the colors printed by the output system. Even an experienced operator finds adjusting the color mapping parameters by this method a time-consuming process of trial and error, requiring much test printing and comparison of sample images. Accurate matching of colors between the input and output systems by this method is quite difficult.

Japanese Unexamined Patent Application Publication No. H09-217386 discloses an apparatus with slide-bars corresponding to the colors cyan, magenta, yellow, and black. The operator can change the mixing ratios of these colors in a stepwise manner by operating the slide-bars, instead of having to enter numerical parameter values. Manipulating slide-bars may be more intuitive than entering numerical values, but it is still difficult to visualize what the effect of a slide-bar adjustment will be on the output colors, so the operator must still proceed by trial and error, and accurate color matching remains difficult.

SUMMARY OF THE INVENTION

An object of the present invention is to provide an image processing apparatus and method in which accurate matching of colors between an input system and an output system can be easily attained.

The invention provides a method of mapping colors from an input system to an output system by first outputting a reference color pattern in the output system. The reference color pattern includes colors with hues varying in a range targeted around the hue of an adjustment color. An input value related to a hue in the reference color pattern corresponding to the hue of the adjustment color in the input system is obtained, and a hue mapping parameter is determined from the input value. The hue mapping parameter is then used to convert colors from the input system to the output system.

The input value may designate a particular hue in the reference color pattern, in which case the hue mapping parameter may be determined from a table of hue mapping parameter values corresponding to different hues in the reference color pattern.

Alternatively, the input value may designate a hue difference between the hue of the adjustment color and the corresponding hue in the reference color pattern, in which case the hue mapping parameter may be determined from a mathematical formula applied to the input value.

In either case, the input value can be obtained by having a human operator select, from the reference color pattern, a hue most closely matching the hue of the adjustment color. For the human operator, this is a simple procedure by which accurate color matching results can be obtained without the need for trial and error.

The invention also provides image processing apparatus employing the invented method.

DETAILED DESCRIPTION OF THE INVENTION

Embodiments of the invention will now be described with reference to the attached drawings, in which like elements are indicated by like reference characters.

In the descriptions of the embodiments, reference will be made to the well-known XYZ, Lab, L*a*b*, and LCH color spaces standardized by the International Commission on Illumination (Commission Internationale de l'Eclairage, or CIE), as well as to the RGB and CMY color spaces mentioned above. Each of these is a mathematical space in which colors are represented by three coordinates. The LCH (lightness, chroma, hue) color space is a cylindrical coordinate space. The L*a*b* color space (illustrated in FIG. 3) is a polar coordinate space that is considered perceptually even.

Figure 1:
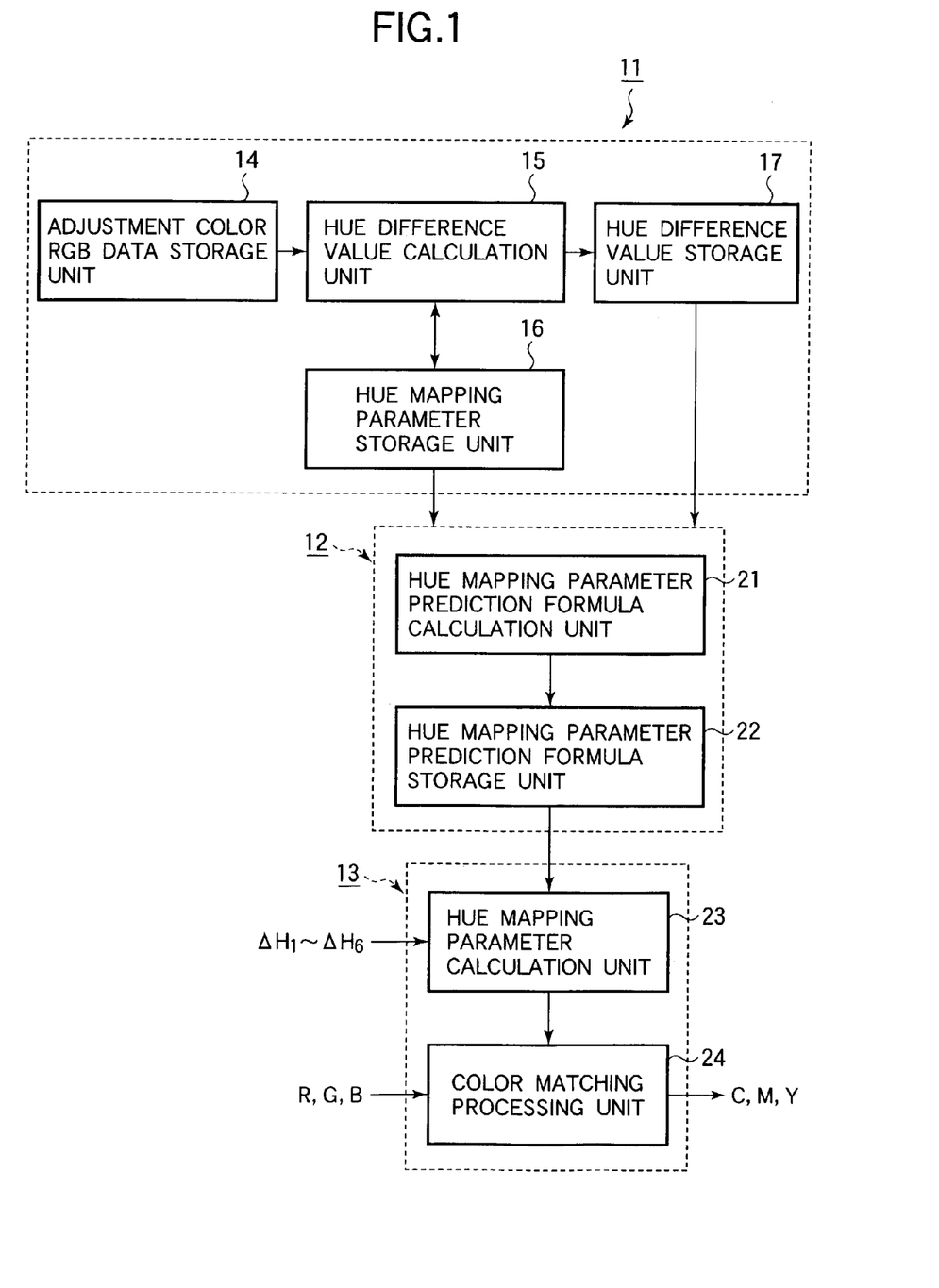
FIG. 1 is a block diagram of an image processing apparatus in a first embodiment of the invention.

Referring to FIG. 1, a first embodiment of the invention is an image processing apparatus comprising a preprocessing unit 11, a prediction formula calculation unit 12, and a matching processing unit 13. These units 11, 12, 13 collectively include various hardware and software facilities, at least some of which reside in a host computing device connected to a color printer. The host computing device may be, for example, a personal computer; the color printer may be, for example, an electrophotographic printer or an ink-jet printer. The host computing device is also connected to a display unit such as a CRT monitor. From the standpoint of color conversion, the display unit is the input system and the color printer is the output system.

The preprocessing unit 11 includes an adjustment color RGB data storage unit 14 that stores red-green-blue data for six preset colors referred to below as adjustment colors. The stored data will be denoted $R_i$, $G_i$, $B_i$ (i=1, 2, ..., 6). The six adjustment colors are intermediate between the primary colors (red, green, blue) of the display unit and the primary colors (cyan, magenta, yellow) of the printer. Table 1 lists the six adjustment colors, their numbers, and their RGB data values, given as percentages.

TABLE 1

| No. | $R_i$ (%) | $G_i$ (%) | $B_i$ (%) | Description |
|---|---|---|---|---|
| 1 | 100 | 50 | 0 | Red-yellow |
| 2 | 50 | 100 | 0 | Yellow-green |
| 3 | 0 | 100 | 50 | Green-cyan |
| 4 | 0 | 50 | 100 | Cyan-blue |
| 5 | 50 | 0 | 100 | Blue-magenta |
| 6 | 100 | 0 | 50 | Magenta-red |

The preprocessing unit 11 also includes a hue difference value calculation unit 15, a hue mapping parameter storage unit 16, and a hue difference value storage unit 17. The hue difference value calculation unit 15 reads data from the adjustment color RGB data storage unit 14 and hue mapping parameter storage unit 16, and writes data in the hue mapping parameter storage unit 16 and hue difference value storage unit 17. The parameters and values stored in the hue mapping parameter storage unit 16 and hue difference value storage unit 17 are supplied to the prediction formula calculation unit 12.

In the hue mapping parameter storage unit 16, the hue difference value calculation unit 15 writes combinations of three typical values (−1, 0, 1) of six hue mapping parameters corresponding to the six intermediate colors in Table 1. The number N of combinations is seven hundred twenty-nine ($N=3^6=729$). These hue mapping parameter values will be denoted ($HP_{RYj}$, $HP_{YGj}$, $HP_{GCj}$, $HP_{CBj}$, $HP_{BMj}$, $HP_{MRj}$) (j=1, 2, ..., 729). Table 2 lists some of the stored combinations of values.

TABLE 2

| case | $HP_{RYj}$ | $HP_{YGj}$ | $HP_{GCj}$ | $HP_{CBj}$ | $HP_{BMj}$ | $HP_{MRj}$ |
|---|---|---|---|---|---|---|
| 1 | −1 | −1 | −1 | −1 | −1 | −1 |
| 2 | −1 | −1 | −1 | −1 | −1 | 0 |
| 3 | −1 | −1 | −1 | −1 | −1 | 1 |
| 4 | −1 | −1 | −1 | −1 | 0 | −1 |
| 5 | −1 | −1 | −1 | −1 | 0 | 0 |
| 6 | −1 | −1 | −1 | −1 | 0 | 1 |
| 7 | −1 | −1 | −1 | −1 | 1 | −1 |
| 8 | −1 | −1 | −1 | −1 | 1 | 0 |
| 9 | −1 | −1 | −1 | −1 | 1 | 1 |
| 10 | −1 | −1 | −1 | 0 | −1 | −1 |
| ⋮ | ⋮ | ⋮ | ⋮ | ⋮ | ⋮ | ⋮ |
| 729 | 1 | 1 | 1 | 1 | 1 | 1 |

The hue difference value calculation unit 15 uses all combinations of the hue mapping parameters in Table 2 to map the six adjustment colors from the input to the output system, calculates the difference between the hue of each adjustment color before and after each mapping, and stores the difference values ($\Delta H_{RYj}$, $\Delta H_{YGj}$, $\Delta H_{GCj}$, $\Delta H_{CBj}$, $\Delta H_{BMj}$, $\Delta H_{MRj}$) (j=1, 2, ..., 729) in the hue difference value storage unit 17.

The prediction formula calculation unit 12 includes a hue mapping parameter prediction formula calculation unit 21 that uses the hue mapping parameters ($HP_{RYj}$, $HP_{YGj}$, $HP_{GCj}$, $HP_{CBj}$, $HP_{BMj}$, $HP_{MRj}$) stored in the hue mapping parameter storage unit 16 and the hue difference values ($\Delta H_{RYj}$, $\Delta H_{YGj}$, $\Delta H_{GCj}$, $\Delta H_{CBj}$, $\Delta H_{BMj}$, $\Delta H_{MRj}$) stored in the hue difference value storage unit 17 to derive a formula for calculating or 'predicting' the hue mapping parameter values that will produce an arbitrary set of hue difference values. This formula is stored in a hue mapping parameter prediction formula storage unit 22.

The matching processing unit 13 includes a hue mapping parameter calculation unit 23 and a color matching processing unit 24. The hue mapping parameter calculation unit 23 receives six hue difference values ($\Delta H_1$ to $\Delta H_6$) from an input processing unit (not shown), and applies the formula stored in the hue mapping parameter prediction formula storage unit 22 to the received values to obtain six hue mapping parameters ($HP_{RY}$, $HP_{YG}$, $HP_{GC}$, $HP_{CB}$, $HP_{BM}$, $HP_{MR}$). The color matching processing unit 24 uses the hue mapping parameters obtained by the hue mapping parameter calculation unit 23 to convert RGB data for the display unit to CMY data for the color printer, thereby mapping colors from the input system to the output system.

Alternatively, the color matching processing unit 24 may convert the RGB data to CMYK data, but for simplicity, CMY output data will be assumed below.

The first embodiment also includes a printer driver (not shown) that forms part of the software of the host computing device. Besides supplying control signals and data to the color printer, the printer driver generates a printing color adjustment image, which is displayed on the display unit. The printing color adjustment image includes the six adjustment colors.

The color printer has a control unit (not shown) including a microprocessor unit (MPU) or any other type of central processing unit (CPU) that controls the internal operation of the printer. One of the control functions performed by this control unit is to print a preset reference color pattern including colors with hues targeted around each of the six adjustment colors. That is, the pattern includes colors with CMY mixing ratios that vary in ranges expected to yield hues that give at least one close match to the hue of each of the adjustment colors. The printed reference color pattern also includes numbers identifying the printed reference colors.

The host computing device has an input unit (not shown) such as a keyboard, with which a human operator can enter the numbers of reference colors selected from the reference color pattern. The human operator compares the reference color pattern printed by the color printer with the adjustment colors displayed by the display unit in the printing color adjustment image, selects the six reference colors most closely matching the hues of the six adjustment color, and enters their numbers. The input processing unit mentioned above converts the entered numbers to the hue difference values ($\Delta H_1$ to $\Delta H_6$) supplied to the hue mapping parameter calculation unit 23.

Various input processing schemes are possible. One example will be shown in the third embodiment.

Figure 2:
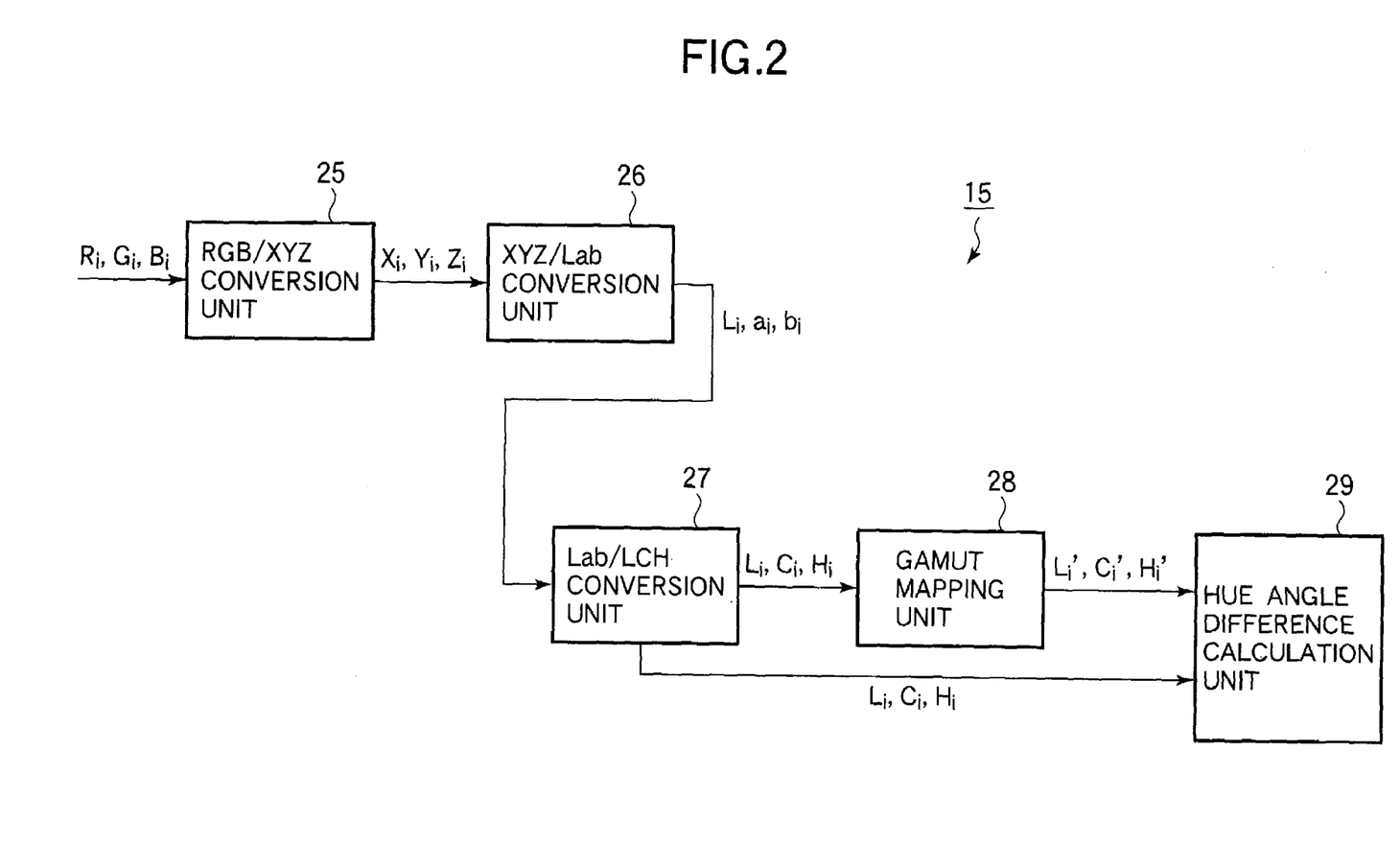
FIG. 2 is an internal block diagram of the hue difference value calculation unit in the first embodiment.

Next, the internal structure of the hue difference value calculation unit 15 will be described.

Figure 3:
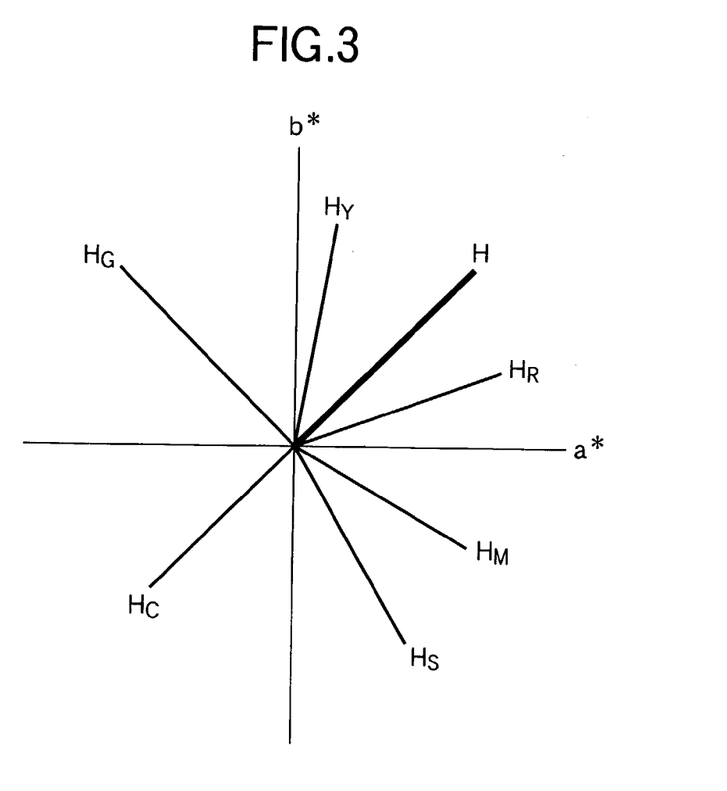
FIG. 3 illustrates hues of primary colors employed in the first embodiment.

Referring to FIG. 2, the hue difference value calculation unit 15 includes three conversion units. An RGB/XYZ conversion unit 25 maps the RGB values ($R_i$, $G_i$, $B_i$) of the adjustment colors into the CIE XYZ color space and generates their XYZ values ($X_i$, $Y_i$, $Z_i$) (i=1, 2, . . . , 6). An XYZ/Lab conversion unit 26 maps the XYZ values from the CIE XYZ space to the CIE L*a*b* space and generates corresponding Lab values ($L_i$, $a_i$, $b_i$) (i=1, 2, . . . , 6). The hues $H_R$, $H_Y$, $H_G$, $H_C$, $H_B$, $H_M$ of red, yellow, green, cyan, blue, and magenta in the input-system gamut are expressed on the a*b* plane in this color space as shown in FIG. 3. A Lab/LCH conversion unit 27 maps the Lab values ($L_i$, $a_i$, $b_i$) from the CIE L*a*b* color space to the LCH color space and generates corresponding LCH values ($L_i$, $C_i$, $H_i$) (i=1, 2, . . . , 6).

The hue difference value calculation unit 15 also includes a gamut mapping unit 28 and a hue angle difference calculation unit 29. The gamut mapping unit 28 maps the LCH values ($L_i$, $C_i$, $H_i$) of the adjustment colors in the input-system gamut to LCH values ($L_i'$, $C_i'$, $H_i'$) (i=1, 2, . . . , 6) in the output-system gamut, using the hue mapping parameters ($HP_{RYj}$, $HP_{YGj}$, $HP_{GCj}$, $HP_{CBj}$, $HP_{BMj}$, $HP_{MRj}$) supplied from the hue mapping parameter storage unit 16. The hue angle difference calculation unit 29 compares the LCH values ($L_i$, $C_i$, $H_i$) of the adjustment colors in the input system, as calculated by the Lab/LCH conversion unit 27, with the corresponding LCH values ($L_i'$, $C_i'$, $H_i'$) in the output system, as calculated by the gamut mapping unit 28, and calculates the hue difference values ($\Delta H_{RYj}$, $\Delta H_{YGj}$, $\Delta H_{GCj}$, $\Delta H_{CBj}$, $\Delta H_{BMj}$, $\Delta H_{MRj}$).

Figure 4:
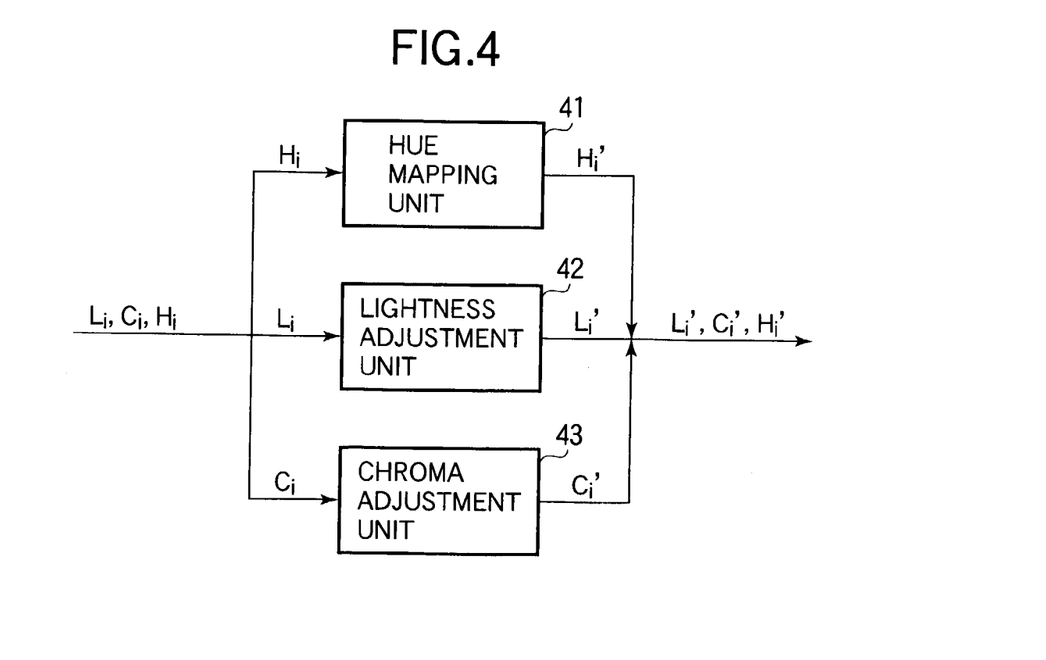
FIG. 4 is an internal block diagram of a gamut mapping processor employed in the first embodiment.

Next, the internal structure of the gamut mapping unit 28 will be described.

Referring to FIG. 4, the gamut mapping unit 28 includes a hue mapping unit 41, a lightness adjustment unit 42, and a chroma adjustment unit 43. The hue mapping unit 41 uses the hue mapping parameters ($HP_{RYj}$, $HP_{YGj}$, $HP_{GCj}$, $HP_{CBj}$, $HP_{BMj}$, $HP_{MRj}$) supplied from the hue mapping parameter storage unit 16 to map H values expressing hue angle in the input system to H' values in the output system. The lightness adjustment unit 42 maps L values expressing lightness in the input system to L' values within the lightness range of the output system. The chroma adjustment unit 43 maps C values expressing chroma in the input system to C' values within the chroma range of the output system. The gamut mapping unit 28 thereby maps the gamut of colors reproducible in the input system to colors within the gamut reproducible in the output system.

Figure 5:
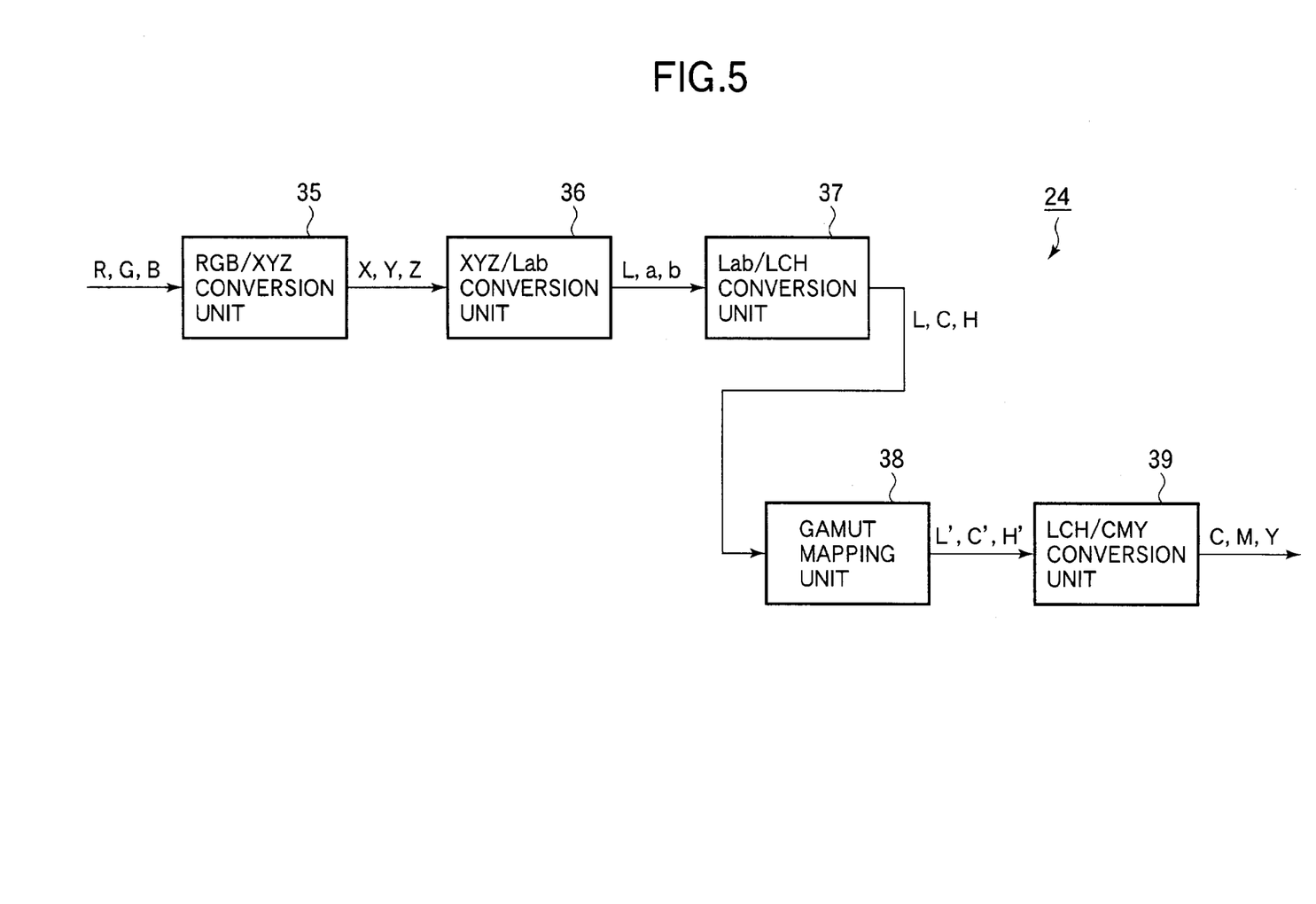
FIG. 5 is an internal block diagram of the color matching processing unit in the first embodiment.

Next, the internal structure of the color matching processing unit 24 will be described.

Referring to FIG. 5, the color matching processing unit 24 includes an RGB/XYZ conversion unit 35, an XYZ/Lab conversion unit 36, an Lab/LCH conversion unit 37, a gamut mapping unit 38, and an LCH/CMY conversion unit 39. The RGB/XYZ conversion unit 35 maps the RGB values of arbitrary input colors to the CIE XYZ space. The XYZ/Lab conversion unit 36 maps the resulting XYZ values (X, Y, Z) into the CIE L*a*b* space, generating Lab values (L, a, b). The Lab/LCH conversion unit 37 maps the Lab values from the L*a*b* space to the LCH space, obtaining LCH values (L, C, H) in the input-system gamut. The gamut mapping unit 38 maps these LCH values (L, C, H) to LCH values ($L_i'$, $C_i'$, $H_i'$) in the output-system gamut, using the color mapping parameters ($HP_{RY}$, $HP_{YG}$, $HP_{GC}$, $HP_{CB}$, $HP_{BM}$, $HP_{MR}$) supplied from the hue mapping parameter calculation unit 23. The LCH/CMY conversion unit 39 converts the output-system LCH values ($L_i'$, $C_i'$, $H_i'$) to CMY data for the color printer.

Next, the operation of the hue difference value calculation unit 15 will be described.

The hue difference value calculation unit 15 reads the six sets of RGB values ($R_i$, $G_i$, $B_i$) from the adjustment color RGB data storage unit 14, and the seven hundred twenty-nine sets of hue mapping parameters ($HP_{RYj}$, $HP_{YGj}$, $HP_{GCj}$, $HP_{CBj}$, $HP_{BMj}$, $HP_{MRj}$) from the hue mapping parameter storage unit 16. After mapping the RGB values ($R_1$, $G_1$, $B_1$) of the first adjustment color into the LCH color space, the hue difference value calculation unit 15 uses the first set of hue mapping parameters ($HP_{RY1}$, $HP_{YG1}$, $HP_{GC1}$, $HP_{CB1}$, $HP_{BM1}$, $HP_{MR1}$) to map the resulting LCH values ($L_1$, $C_1$, $H_1$), which lie in the input-system gamut, to LCH values ($L_1'$, $C_1'$, $H_1'$) in the output-system gamut; then it compares the input-system hue value $H_1$ with the output-system hue value $H_1'$, and calculates and outputs the difference $\Delta H_{RY1}$ between the two hue values $H_1$ and $H_1'$.

Next, the hue difference value calculation unit 15 uses the second set of hue mapping parameters ($HP_{RY2}$, $HP_{YG2}$, $HP_{GC2}$, $HP_{CB2}$, $HP_{BM2}$, $HP_{MR2}$) to map the input-system LCH values ($L_1$, $C_1$, $H_1$) of the first adjustment color to LCH values ($L_1'$, $C_1'$, $H_1'$) in the output-system gamut, compares the input-system hue ($H_1$) with the new output-system hue ($H_1'$), and calculates and outputs the difference $\Delta H_{RY2}$ between them.

Hue difference values $\Delta H_{RYj}$ (j=3, 4, . . . , 729) for the first adjustment color are similarly calculated and output by using the third to 729th sets of hue mapping parameters ($HP_{RYj}$, $HP_{YGj}$, $HP_{GCj}$, $HP_{CBj}$, $HP_{BMj}$, $HP_{MRj}$).

Next, the hue difference value calculation unit 15 maps the RGB values ($R_2$, $G_2$, $B_2$) of the second adjustment color into the LCH color space, uses the first set of hue mapping parameters ($HP_{RY1}$, $HP_{YG1}$, $HP_{GC1}$, $HP_{CB1}$, $HP_{BM1}$, $HP_{MR1}$) to map the resulting input-system LCH values ($L_2$, $C_2$, $H_2$) to output-system LCH values ($L_2'$, $C_2'$, $H_2'$), compares the hue values $H_2$ and $H_2'$, and calculates and outputs a hue difference value $\Delta H_{YG1}$ expressing the difference between $H_2$ and $H_2'$. Hue difference values $\Delta H_{YGj}$ for the second adjustment color are similarly calculated and output using the second to 729th hue mapping parameters ($HP_{RYj}$, $HP_{YGj}$, $HP_{GCj}$, $HP_{CBj}$, $HP_{BMj}$, $HP_{MRj}$) The same process is repeated for the other four adjustment colors, so that a complete set of hue difference values ($\Delta H_{RYj}$, $\Delta H_{YGj}$, $\Delta H_{GCj}$, $\neq H_{CBj}$, $\Delta H_{BMj}$, $\Delta H_{MRj}$) for all six adjustment colors is obtained (j=1 to 729).

Next, the operation of the RGB/XYZ conversion unit 25, XYZ/Lab conversion unit 26, Lab/LCH conversion unit 27, gamut mapping unit 28, and hue angle difference calculation unit 29 in the calculation of these hue difference values ($\Delta H_{RYj}$, $\Delta H_{YGj}$, $\Delta H_{GCj}$, $\Delta H_{CBj}$, $\Delta H_{BMj}$, $\Delta H_{MRj}$) will be described.

The RGB/XYZ conversion unit 25 converts input RGB values ($R_i$, $G_i$, $B_i$) to XYZ values ($X_i$, $Y_i$, $Z_i$) In the RGB values ($R_i$, $G_i$, $B_i$), colors are reproduced by additive color mixing, so the conversion is effected as a linear transformation represented by the following 3×3 matrix.

$$\begin{bmatrix} X_R & X_G & X_B \\ Y_R & Y_G & Y_B \\ Z_R & Z_G & Z_B \end{bmatrix}$$

More specifically, the XYZ values ($X_i$, $Y_i$, $Z_i$) corresponding to the input RGB values ($R_i$, $G_i$, $B_i$) are calculated by the following matrix operation.

$$\begin{bmatrix} X_i \\ Y_i \\ Z_i \end{bmatrix} = \begin{bmatrix} X_R & X_G & X_B \\ Y_R & Y_G & Y_B \\ Z_R & Z_G & Z_B \end{bmatrix} \begin{bmatrix} R_i \\ G_i \\ B_i \end{bmatrix}$$

The XYZ/Lab conversion unit 26 uses a well-known conversion formula to convert the XYZ values ($X_i$, $Y_i$, $Z_i$) supplied from the RGB/XYZ conversion unit 25 to Lab values ($L_i$, $a_i$, $b_i$). A detailed description will be omitted.

The Lab/LCH conversion unit 27 converts the Lab values ($L_i$, $a_i$, $b_i$) supplied from the XYZ/Lab conversion unit 26 to LCH values ($L_i$, $C_i$, $H_i$) by the following formulas.

$$L_i = L_i$$

$$C_i = \sqrt{(a_i^2 + b_i^2)}$$

$$H_i = \tan^{-1}(a_i/b_i)$$

As stated above, the gamut mapping unit 28 maps LCH values ($L_i$, $C_i$, $H_i$) in the input-system gamut to LCH values ($L_i'$, $C_i'$, $H_i'$) in the output-system gamut. In this process, the lightness adjustment unit 42 maps the $L_i$ value to an $L_i'$ value as follows, where $L_i'$max is the maximum value and $L_i'$min is the minimum value in the lightness range of the output-system gamut.

$$L_i' = L_i'\text{max if } L_i > L_i'\text{max},$$

$$L_i' = L_i'\text{min if } L_i < L_i'\text{min, and}$$

$$L_i' = L_i \text{ if } L_i'\text{min} \leq L_i \leq L_i'\text{max}.$$

The chroma adjustment unit 43 maps the $C_i$ value to a $C_i'$ value in the output-system gamut as follows, where $C_i'$max is the maximum value in the chroma range of the output-system gamut.

$$C_i' = C_i'\text{max if } C_i > C_i'\text{max}$$

$$C_i' = C_i \text{ if } C_i \leq C_i'\text{max},$$

The hue mapping unit 41 uses the hue mapping parameters ($HP_{RYj}$, $HP_{YGj}$, $HP_{GCj}$, $HP_{CBj}$, $HP_{BMj}$, $HP_{MRj}$) supplied from the hue mapping parameter storage unit 16 to map the $H_i$ value expressing hue angle in the input system to an $H_i'$ value expressing hue angle in the output system. Further details of this mapping process will be given later.

Continuing, the hue angle difference calculation unit 29 calculates the hue difference between the $H_i$ value supplied from the Lab/LCH conversion unit 27 and the $H_i'$ value supplied from the gamut mapping unit 28 by the following subtraction operation, in which value $\Delta H$ denotes one of the hue difference values $\Delta H_{RYj}$, $\Delta H_{YGj}$, $\Delta H_{GCj}$, $\Delta H_{CBj}$, $\Delta H_{BMj}$, $\Delta H_{MRj}$ mentioned above (j=1, 2, . . . , 729).

$$\Delta H = H_i' - H_i$$

Next, the operation of the RGB/XYZ conversion unit 35, XYZ/Lab conversion unit 36, Lab/LCH conversion unit 37, gamut mapping unit 38, and LCH/CMY conversion unit 39 in the color matching processing unit 24 will be described. The gamut mapping unit 38 has the same internal structure as the gamut mapping unit 28 shown in FIG. 4.

The RGB/XYZ conversion unit 35 converts RGB values (R, G, B) to XYZ values (X, Y, Z) by the 3×3 matrix operation described above. Specifically, the XYZ values (X, Y, Z) corresponding to the RGB values (R, G, B) are calculated as follows.

$$\begin{bmatrix} X \\ Y \\ Z \end{bmatrix} = \begin{bmatrix} X_R & X_G & X_B \\ Y_R & Y_G & Y_B \\ Z_R & Z_G & Z_B \end{bmatrix} \begin{bmatrix} R \\ G \\ B \end{bmatrix}$$

The XYZ/Lab conversion unit 36 uses the well-known conversion formula mentioned above to convert the XYZ values (X, Y, Z) supplied from the RGB/XYZ conversion unit 35 to Lab values (L, a, b).

The Lab/LCH conversion unit 37 converts the Lab values (L, a, b) supplied from the XYZ/Lab conversion unit 36 to LCH values (L, C, H) by the following formulas.

$$L = L$$

$$C = \sqrt{(a^2 + b^2)}$$

$$H = \tan^{-1}(a/b)$$

The gamut mapping unit 38 maps the input-system LCH values (L, C, H) to LCH values (L', C', H') in the output-system gamut. Of the input-system LCH values (L, C, H), the L value is sent to the lightness adjustment unit 42 in the gamut mapping unit 38, and mapped to an L' value in the output-system gamut as described above. The C value is sent to the chroma adjustment unit 43 in the gamut mapping unit 38, and mapped to a C' value in the output-system gamut as described above. The H value is sent to the hue mapping unit 41 and mapped to an H' value in the output-system gamut by use of the hue mapping parameters ($HP_{RY}$, $HP_{YG}$, $HP_{GC}$, $HP_{CB}$, $HP_{BM}$, $HP_{MR}$) supplied from the hue mapping parameter calculation unit 23.

The LCH/CMY conversion unit 39 converts the LCH values (L', C', H') supplied from the gamut mapping unit 38 to CMY values (C, M, Y) for output to the color printer. Details of this conversion process will be omitted.

Next, the hue mapping operation carried out by the hue mapping units 41 in the two gamut mapping units 28, 38 will be described.

The hue mapping unit 41 in gamut mapping unit 28 receives hue mapping parameters ($HP_{RYj}$, $HP_{YGj}$, $HP_{GCj}$, $HP_{CBj}$, $HP_{BMj}$, $HP_{MRj}$) from the hue mapping parameter storage unit 16. The hue mapping unit 41 in gamut mapping unit 38 receives hue mapping parameters ($HP_{RY}$, $HP_{YG}$, $HP_{GC}$, $HP_{CB}$, $HP_{BM}$, $HP_{MR}$) from the hue mapping parameter calculation unit 23. Both hue mapping units 41 map a hue angle value (H or $H_i$) in the input-system gamut to a hue-angle value (H' or $H_i'$) in the output-system gamut, as noted above.

As also noted above, the hue mapping parameters ($HP_{RYj}$, $HP_{YGj}$, $HP_{GCj}$, $HP_{CBj}$, $HP_{BMj}$, $HP_{MRj}$) apply to hues intermediate between red and yellow (R-Y), yellow and green (Y-G), green and cyan (G-C), cyan and blue (C-B), blue and magenta (B-M), and magenta and red (M-R), respectively, and take on the three values −1, 0, 1. The predicted hue mapping parameters ($HP_{RY}$, $HP_{YG}$, $HP_{GC}$, $HP_{CB}$, $HP_{BM}$, $HP_{MR}$) likewise apply to hues intermediate between red and yellow (R-Y), yellow and green (Y-G), green and cyan (G-C), cyan and blue (C-B), blue and magenta (B-M), and magenta and red (M-R), respectively, but may take on arbitrary values in the interval from −1 to 1.

The values −1, 0, 1 and the values from −1 to 1 are weighting coefficients for the colors disposed between the two relevant hues. The larger the absolute values of the hue mapping parameters ($HP_{RYj}$, $HP_{YGj}$, $HP_{GCj}$, $HP_{CBj}$, $HP_{BMj}$, $HP_{MRj}$) and ($HP_{RY}$, $HP_{YG}$, $HP_{GC}$, $HP_{CB}$, $HP_{BM}$, $HP_{MR}$) are, the more the hue angle is changed. The direction of the hue angle change is indicated by arrows in Table 3.

TABLE 3

| | R-Y | Y-G | G-C | C-B | B-M | M-R |
|---|---|---|---|---|---|---|
| −1 to 0 | R ← | Y ← | G ← | C ← | B ← | M ← |
| 0 | | | No change | | | |
| 0 to 1 | → Y | → G | → C | → B | → M | → R |

The hue mapping processes carried out by the hue mapping units 41 in the two gamut mapping units 28, 38 differ only in the values of the hue mapping parameters, so the hue mapping process in the hue mapping unit 41 of the gamut mapping unit 38 will be described below, and a description of the hue mapping process in the hue mapping unit 41 of the gamut mapping unit 28 will be omitted.

First, the hue mapping unit 41 converts each of the hue mapping parameters ($HP_{RY}$, $HP_{YG}$, $HP_{GC}$, $HP_{CB}$, $HP_{BM}$, $HP_{MR}$) to a gamma coefficient γ and sets a flag. These operations are carried out as follows, where p represents the value of an arbitrary one of the hue mapping parameters ($HP_{RY}$, $HP_{YG}$, $HP_{GC}$, $HP_{CB}$, $HP_{BM}$, $HP_{MR}$).

if p<0
then $\gamma = 2^{-p}$
and flag=−1,
if p=0
then $\gamma = 2^p$
and flag=0,
if p>0
then $\gamma = 2^p$
and flag=1.

Next, the hue mapping unit 41 calculates an inter-hue ratio for the hue of the input color, which has been mapped from the RGB color space to the LCH color space and has a hue value H.

First, the hue mapping unit 41 finds the hues ($H_S$, $H_E$) of the two primary colors between which the input hue H is disposed. For example, if the input hue H is disposed between red ($H_R$) and yellow ($H_Y$), then:

$H_S = H_R$
$H_E = H_Y$

Next, a Ratio describing the position of the input hue H between the two hues $H_S$ and $H_E$) is calculated as follows:

if flag=−1
then Ratio=$(H-H_S)/(H_E-H_S)$,
if flag=1
then Ratio=$(H_E-H)/(H_E-H_S)$.

Next, the calculated ratio is weighted by the gamma coefficient γ. If Ratio' is the weighted ratio, then Ratio'=Ratio$^\gamma$ The value H representing the hue angle of the input color is then mapped to a value H' in the output-system gamut by application of the weighted Ratio'. The mapping is carried out as follows:

if flag=−1
then H'=Ratio'×$(H_E-H_S)+H_S$,
if flag=1
then H'=(1.0−Ratio')×$(H_E-H_S)+H_S$,
if flag=0
then H'=H.

Next the calculation of the prediction formula by the prediction formula calculation unit 12 will be described. This calculation is based on the assumption that there is a relationship of the following type between a given set of hue mapping parameters ($HP_{RY}$, $HP_{YG}$, $HP_{GC}$, $HP_{CB}$, $HP_{BM}$, $HP_{MR}$) and the hue difference value $\Delta H_1$ produced thereby for the first adjustment color.

$$\Delta H_1 = a_1 HP_{RY} + b_1 HP_{YG} + c_1 HP_{GC} + d_1 HP_{CB} + e_1 HP_{BM} + f_1 HP_{MR} + g_1 \quad (1)$$

The values of the hue mapping parameters ($HP_{RYj}$, $HP_{YGj}$, $HP_{GCj}$, $HP_{CBj}$, $HP_{BMj}$, $HP_{MRj}$) and the corresponding hue difference values $\Delta H_{RYj}$ calculated by the hue difference value calculation unit 15 are substituted into this equation (1) as statistical data, and the coefficients $a_1$ to $g_1$ in are derived by multiple regression analysis by the hue mapping parameter prediction formula calculation unit 21.

Next, prediction formula coefficients $a_2$ to $g_2$, $a_3$ to $g_3$, $a_4$ to $g_4$, $a_5$ to $g_5$, and $a_6$ to $g_6$ are similarly calculated, on the basis of the relations below, using the hue difference values $\Delta H_2$ to $\Delta H_6$ calculated for the second through sixth adjustment colors.

$$\Delta H_2 = a_2 HP_{RY} + b_2 HP_{YG} + c_2 HP_{GC} + d_2 HP_{CB} + e_2 HP_{BM} + f_2 HP_{MR} + g_2$$

$$\Delta H_3 = a_3 HP_{RY} + b_3 HP_{YG} + c_3 HP_{GC} + d_3 HP_{CB} + e_3 HP_{BM} + f_3 HP_{MR} + g_3$$

$$\Delta H_4 = a_4 HP_{RY} + b_4 HP_{YG} + c_4 HP_{GC} + d_4 HP_{CB} + e_4 HP_{BM} + f_4 HP_{MR} + g_4$$

$$\Delta H_5 = a_5 HP_{RY} + b_5 HP_{YG} + c_5 HP_{GC} + d_5 HP_{CB} + e_5 HP_{BM} + f_5 HP_{MR} + g_5$$

$$\Delta H_6 = a_6 HP_{RY} + b_6 HP_{YG} + c_6 HP_{GC} + d_6 HP_{CB} + e_6 HP_{BM} + f_6 HP_{MR} + g_6$$

Once the values of the coefficients ($a_1$ to $g_6$) have been determined, the above set of six simultaneous equations can be solved to determine the unknown values of the hue mapping parameters ($HP_{RY}$, $HP_{YG}$, $HP_{GC}$, $HP_{CB}$, $HP_{BM}$, $HP_{MR}$) from a given set of hue difference values $\Delta H_1$ to $\Delta H_6$. These simultaneous equations can be written as a single matrix equation in which A represents the matrix of coefficients $a_i$ to $f_i$ (i=1, 2, . . . , 6) and C represents the column vector of coefficients $g_i$ (i=1, 2, . . . , 6). Specifically, $$\begin{bmatrix} \Delta H_1 \\ \Delta H_2 \\ \Delta H_3 \\ \Delta H_4 \\ \Delta H_5 \\ \Delta H_6 \end{bmatrix} = A \begin{bmatrix} HP_{RY} \\ HP_{YG} \\ HP_{GC} \\ HP_{CM} \\ HP_{MB} \\ HP_{BR} \end{bmatrix} + C$$

where, $$A = \begin{bmatrix} a_1 & b_1 & c_1 & d_1 & e_1 & f_1 \\ a_2 & b_2 & c_2 & d_2 & e_2 & f_2 \\ a_3 & b_3 & c_3 & d_3 & e_3 & f_3 \\ a_4 & b_4 & c_4 & d_4 & e_4 & f_4 \\ a_5 & b_5 & c_5 & d_5 & e_5 & f_5 \\ a_6 & b_6 & c_6 & d_6 & e_6 & f_6 \end{bmatrix} \quad C = \begin{bmatrix} g_1 \\ g_2 \\ g_3 \\ g_4 \\ g_5 \\ g_6 \end{bmatrix}$$

The matrix A can be inverted to obtain a matrix $A^{-1}$. This matrix $A^{-1}$ and the column vector C provide a formula for calculating the hue mapping parameters from the hue difference values. The hue mapping parameter prediction formula calculation unit 21 stores the values of this matrix and vector ($A^{-1}$, C) in the hue mapping parameter prediction formula storage unit 22.

The hue mapping parameter calculation unit 23 calculates the hue mapping parameters ($HP_{RY}$, $HP_{YG}$, $HP_{GC}$, $HP_{CB}$, $HP_{BM}$, $HP_{MR}$) for performing color conversion on actual input colors (R, G, B) from the data stored in the hue mapping parameter prediction formula storage unit 22 by performing the following matrix operation on the six hue difference values ($\Delta H_1$ to $\Delta H_6$) obtained by the input processing unit from the six reference colors selected by the operator as most closely matching the hues of the adjustment colors.

$$\begin{bmatrix} HP_{RY} \\ HP_{YG} \\ HP_{GC} \\ HP_{CM} \\ HP_{MB} \\ HP_{BR} \end{bmatrix} = A^{-1} \begin{bmatrix} \Delta H_1 \\ \Delta H_2 \\ \Delta H_3 \\ \Delta H_4 \\ \Delta H_5 \\ \Delta H_6 \end{bmatrix} - A^{-1} C$$

The color matching processing unit 24 receives the hue mapping parameters ($HP_{RY}$, $HP_{YG}$, $HP_{GC}$, $HP_{CB}$, $HP_{BM}$, $HP_{MR}$) from the hue mapping parameter calculation unit 23, receives input RGB color data from an external interface (not shown), and converts the input color values (R, G, B) to output color values (C, M, Y).

Since the output colors are printed by subtractive color mixing, LCH values (L', C', H') corresponding to combinations of CMY values (C, M, Y) may be calculated in advance by colorimetry, and the LCH values (L', C', H') and corresponding CMY values (C, M, Y) may be stored in a look-up table. The color matching processing unit 24 can then convert an LCH value (L', C', H') to a CMY value (C, M, Y) by referring to the look-up table.

In the present embodiment, because the hue mapping parameters ($HP_{RY}$, $HP_{YG}$, $HP_{GC}$, $HP_{CB}$, $HP_{BM}$, $HP_{MR}$) are calculated from the hue difference values ($\Delta H_1$, $\Delta H_2$, $\Delta H_3$, $\Delta H_4$, $\Delta H_5$, $\Delta \Delta H_6$) of colors directly selected as matching the hues of the adjustment colors, the hues of the colors reproduced in the output system will generally match the hues of the colors reproduced in the input system closely. Moreover, there is no need to proceed by trial and error, so the work of adjusting the hue mapping parameters is greatly simplified.

Next, a second embodiment of the invention will be described.

Figure 6:
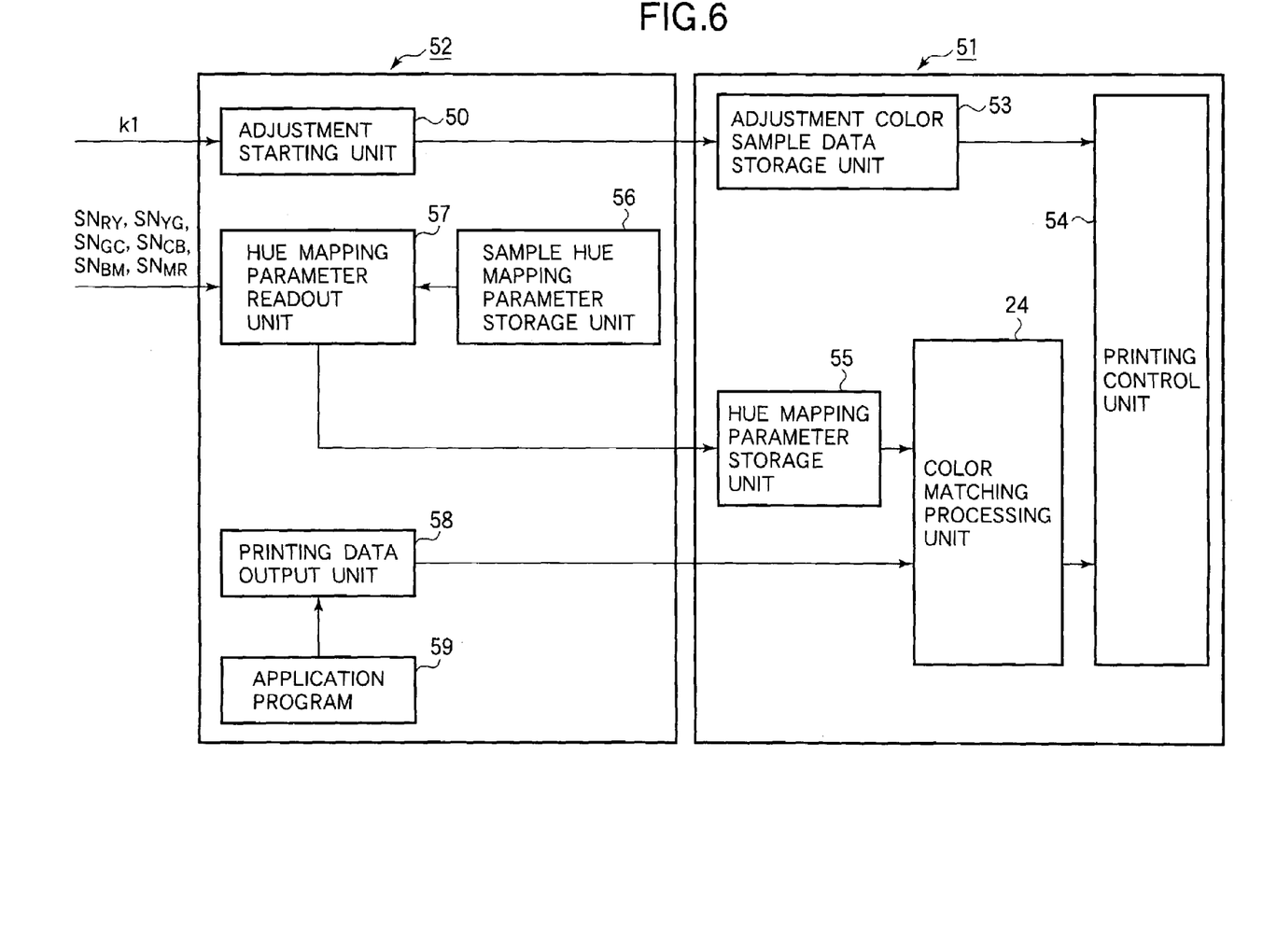
FIG. 6 is a block diagram of an image processing apparatus in a second embodiment of the invention.
Figure 7:
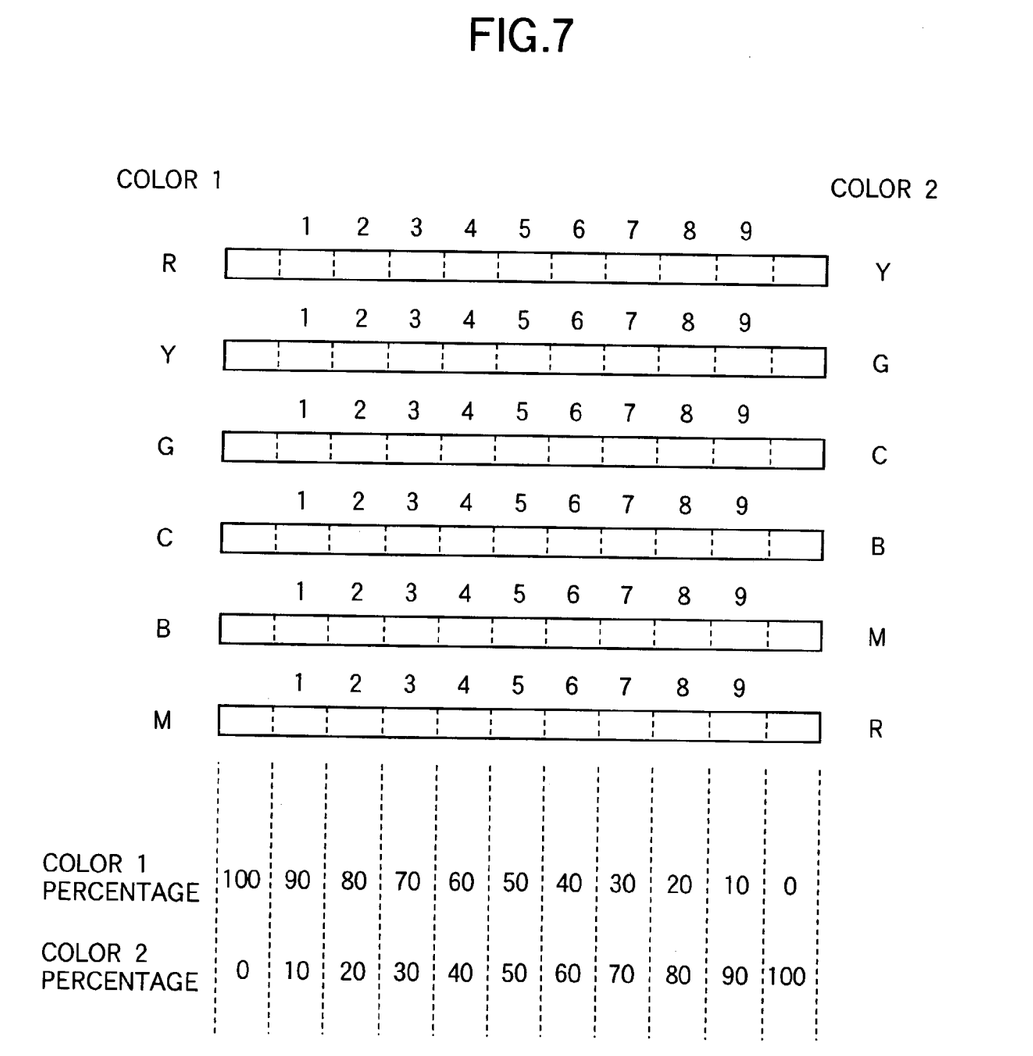
FIG. 7 illustrates a reference color pattern printed in the second embodiment.
Figure 8:
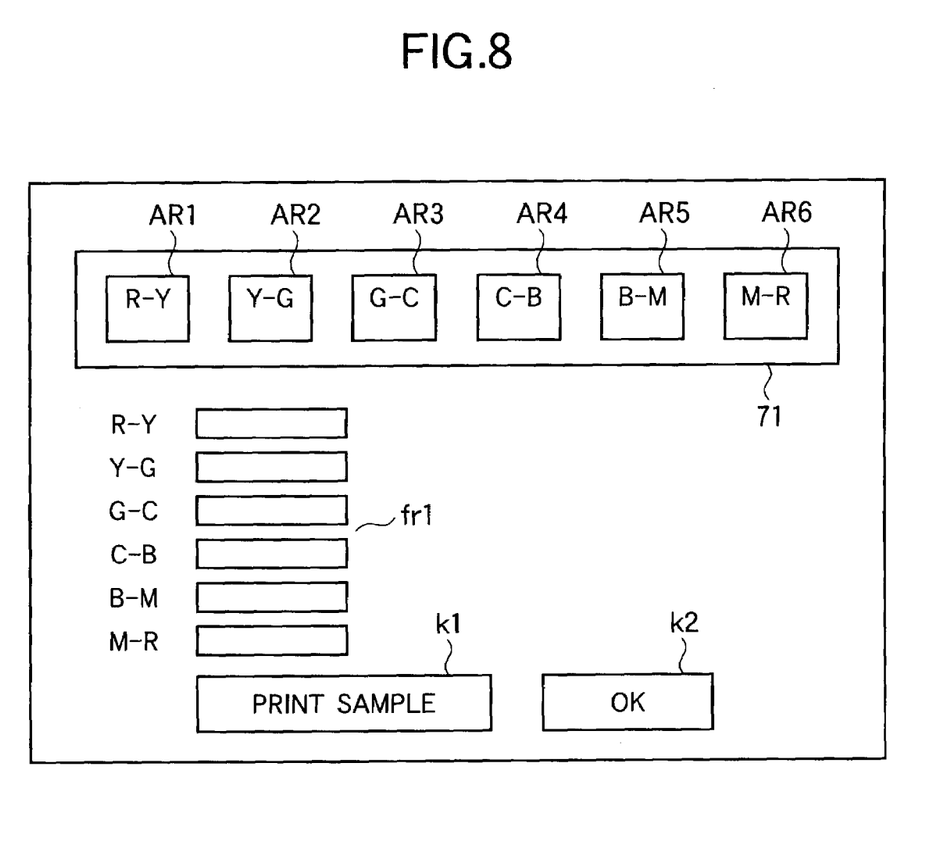
FIG. 8 illustrates a printing color adjustment image displayed in the second embodiment.

FIG. 6 shows a block diagram of an image processing apparatus according to the second embodiment, FIG. 7 shows an example of the reference color pattern printed in the second embodiment, and FIG. 8 shows an example of the printing color adjustment image displayed in the second embodiment.

The color printer 51 used as the output system in the second embodiment is driven by a printer driver 52 residing as software in the host computing device (not shown). The color printer 51 includes a color matching processing unit 24 as described in the first embodiment, an adjustment color sample data storage unit 53, a printing control unit 54, and a hue mapping parameter storage unit 55. The adjustment color sample data storage unit 53 stores data for printing a reference color pattern in which the mixing ratios of the color components of the adjustment colors are varied in steps. The adjustment colors are the same as in the first embodiment (Table 1).

Referring to FIG. 7, the reference color pattern includes the six primary colors of the input and output systems, namely red (R), yellow (Y), green (G), cyan (C), blue (B), and magenta (M), and nine reference colors in each of the six intervals (red-yellow, yellow-green, green-cyan, cyan-blue, blue-magenta, and magenta-red) between mutually adjacent pairs of primary colors. In each interval, the mixing ratios of the primary colors vary in steps of 10% from 0% to 100%. The primary colors are identified as color 1 and color 2 in FIG. 7, and the mixing ratios are indicated between the reference colors. The reference colors themselves are identified by numbers from one to nine in each interval.

The printing control unit 54 includes a reference color output means (not shown) that prints the reference color pattern shown in FIG. 7, using the adjustment color sample data stored in the adjustment color sample data storage unit 53, and a printing processing means (not shown) that prints general color images according to CMY values (C, M, Y) supplied from the color matching processing unit 24. The color matching processing unit 24 operates on RGB data supplied from the printer driver 52 according to hue mapping parameters ($HP_{RY}$, $HP_{YG}$, $HP_{GC}$, $HP_{CB}$, $HP_{BM}$, $HP_{MR}$) stored in the hue mapping parameter storage unit 55. The hue mapping parameters ($HP_{RY}$, $HP_{YG}$, $HP_{GC}$, $HP_{CB}$, $HP_{BM}$, $HP_{MR}$) are supplied from the printer driver 52.

The reference color output means in the printing control unit 54 and the adjustment color sample data storage unit 53 form a reference color output processing unit that outputs the reference color pattern in the output system.

The printer driver 52 includes an adjustment starting unit 50, a sample hue mapping parameter storage unit 56, a hue mapping parameter readout unit 57 used as a hue mapping parameter determination means, a printing data output unit 58, and an application program 59. The sample hue mapping parameter storage unit 56 stores hue mapping parameters that map the adjustment colors to the reference colors printed in the reference color pattern in FIG. 7. The stored hue mapping parameters ($HP_{RYk}$, $HP_{YGk}$, $HP_{GCk}$, $HP_{CBk}$, $HP_{BMk}$, $HP_{MRk}$) are listed in Table 4, where the value of k (k=10, 20, ..., 90) corresponds to the percentage of color 2 in FIG. 7.

TABLE 4

| | Hue interval spacing | | | | | | | | |
|---|---|---|---|---|---|---|---|---|---|
| | 10[%] | 20[%] | 30[%] | 40[%] | 50[%] | 60[%] | 70[%] | 80[%] | 90[%] |
| Hue interval | | | | | | | | | |
| R–Y | $HP_{RY10}$ | $HP_{RY20}$ | $HP_{RY30}$ | $HP_{RY40}$ | $HP_{RY50}$ | $HP_{RY60}$ | $HP_{RY70}$ | $HP_{RY80}$ | $HP_{RY90}$ |
| Y–G | $HP_{YG10}$ | $HP_{YG20}$ | $HP_{YG30}$ | $HP_{YG40}$ | $HP_{YG50}$ | $HP_{YG60}$ | $HP_{YG70}$ | $HP_{YG80}$ | $HP_{YG90}$ |
| G–C | $HP_{GC10}$ | $HP_{GC20}$ | $HP_{GC30}$ | $HP_{GC40}$ | $HP_{GC50}$ | $HP_{GC60}$ | $HP_{GC70}$ | $HP_{GC80}$ | $HP_{GC90}$ |
| C–B | $HP_{CB10}$ | $HP_{CB20}$ | $HP_{CB30}$ | $HP_{CB40}$ | $HP_{CB50}$ | $HP_{CB60}$ | $HP_{CB70}$ | $HP_{CB80}$ | $HP_{CB90}$ |
| B–M | $HP_{BM10}$ | $HP_{BM20}$ | $HP_{BM30}$ | $HP_{BM40}$ | $HP_{BM50}$ | $HP_{BM60}$ | $HP_{BM70}$ | $HP_{BM80}$ | $HP_{BM90}$ |
| M–R | $HP_{MR10}$ | $HP_{MR20}$ | $HP_{MR30}$ | $HP_{MR40}$ | $HP_{MR50}$ | $HP_{MR60}$ | $HP_{MR70}$ | $HP_{MR80}$ | $HP_{MR90}$ |

The numerical values of the hue mapping parameters in Table 4 may be calculated by the method described in the first embodiment, or by any other convenient method.

The printer driver 52 also includes means (not shown) for displaying the printing color adjustment image in FIG. 8. This image has a color display section 71 with areas AR1 to AR6 for display of the six adjustment colors in the hue intervals between red and yellow (R-Y), yellow and green (Y-G), green and cyan (G-C), cyan and blue (C-B), blue and magenta (B-M), and magenta and red (M-R). Frames fr1 are also displayed in which the operator can enter numbers from one to nine to identify a reference color matching the hue of each adjustment color, selected from the hue interval to which the adjustment color belongs in the reference color pattern in FIG. 7.

Displayed at the bottom of the printing color adjustment image in FIG. 8 are a button k1 that the operator can activate with a pointing device such as a mouse to start the hue mapping adjustment process, and a button k2 that can be activated to conclude the hue mapping adjustment process. When the operator activates button k1, the adjustment starting unit 50 sends a reference color pattern printing command to the color printer 51. When the operator activates button k2, the hue mapping parameter readout unit 57 sends the color printer 51 hue mapping parameters read from the sample hue mapping parameter storage unit 56.

The printing data output unit 58 generates RGB color data according to printing data obtained from the application program 59, and sends the RGB data to the color printer 51. The application program 59, incidentally, may be external to the printer driver 52 instead of internal thereto as shown.

Next, the operation of the second embodiment will be described.

To begin the process of adjusting the hue mapping parameters, the operator activates button k1 in FIG. 8, causing the adjustment starting unit 50 to send the color printer 51 a command to print the reference color pattern. In response to this command, the data stored in the adjustment color sample data storage unit 53 are provided to the printing control unit 54, which prints the data as the reference color pattern shown in FIG. 7. At the same time, the printer driver 51 displays the color printing adjustment image shown in FIG. 8 on the display unit of the host computing device.

Next, the operator selects the printed reference colors with hues closest to the hues of the six adjustment colors displayed in areas AR1 to AR6 of the printing color adjustment image, and enters the corresponding numbers in the frames fr1. An input processing unit (not shown) in the printer driver 52 processes the entered numbers and generates selected color designation signals ($SN_{RY}$, $SN_{YG}$, $SN_{GC}$, $SN_{CB}$, $SN_{BM}$, $SN_{MR}$), which are supplied to the hue mapping parameter readout unit 57. The hue mapping parameter readout unit 57 reads the six hue mapping parameters ($HP_{RY}$, $HP_{YG}$, $HP_{GC}$, $HP_{CB}$, $HP_{BM}$, $HP_{MR}$) corresponding to the selected color designation signals ($SN_{RY}$, $SN_{YG}$, $SN_{GC}$, $SN_{CB}$, $SN_{BM}$, $SN_{MR}$) from the sample hue mapping parameter storage unit 56.

When the operator activates button k2, the hue mapping parameter readout unit 57 sends these hue mapping parameters ($HP_{RY}$, $HP_{YG}$, $HP_{GC}$, $HP_{CB}$, $HP_{BM}$, $HP_{MR}$) to the color printer 51. The color printer 51 stores the received hue mapping parameters in the hue mapping parameter storage unit 55. Display of the printing color adjustment image may be terminated at this point.

After these preparations, when the application program 59 sends printing data to the printing data output unit 58 in the printer driver 52, the printing data output unit 58 sends corresponding RGB color data to the color matching processing unit 24 in the color printer 51. The color matching processing unit 24 uses the six hue mapping parameters ($HP_{RY}$, $HP_{YG}$, $HP_{GC}$, $HP_{CB}$, $HP_{BM}$, $HP_{MR}$) stored in the hue mapping parameter storage unit 55 to convert the RGB color data to CMY color data, as described in the first embodiment, and sends the CMY data to the printing control unit 54. The printing processing means in the printing control unit 54 performs printing processing according to the CMY data, thereby printing images created by the application program 59.

The second embodiment has the same effects as the first embodiment. Since the hue mapping parameters are determined by directly selecting printed reference colors that match the hues of the adjustment colors, accurate color mapping from the input system to the output system can be achieved without the need for a lengthy trial-an-error process of parameter adjustment.

Next, a third embodiment of the invention will be described.

Figure 9:
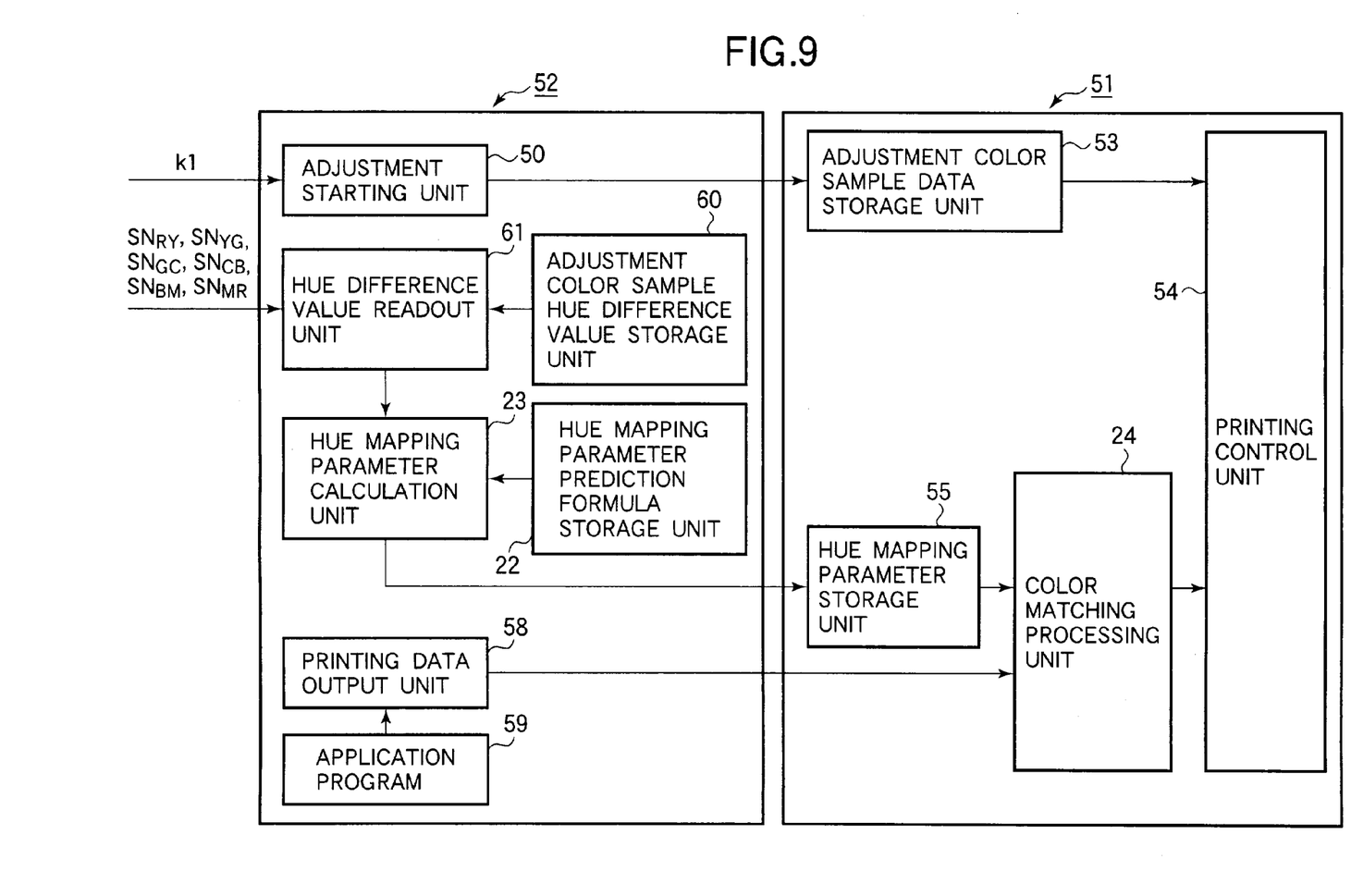
FIG. 9 is a block diagram of an image processing apparatus in a third embodiment of the invention.

Referring to FIG. 9, the third embodiment includes the same color printer 51 as in the second embodiment, and a printer driver 52. The printer driver 52 includes a hue mapping parameter prediction formula storage unit 22 and a hue mapping parameter calculation unit 23 as described in the first embodiment; an adjustment starting unit 50, a printing data output unit 58, and an application program 59 as described in the second embodiment; an adjustment color sample hue difference value storage unit 60; and a hue difference value readout unit 61. The printer driver 52 also includes means (not shown) for displaying a printing color adjustment image such as the one in FIG. 8, including the six adjustment colors used in the first and second embodiments.

The adjustment color sample hue difference value storage unit 60 stores hue difference values indicating hue differences between the adjustment colors and the reference colors in the same hue intervals as the adjustment colors.

The stored hue difference values ($\Delta H_{RYn}$, $\Delta H_{YGn}$, $\Delta H_{GCn}$, $\Delta H_{CBn}$, $\Delta H_{BMn}$, $\Delta H_{MRn}$) (n=10, 20, . . . , 90) are listed in Table 5.

TABLE 5

| | Hue interval spacing | | | | | | | | |
|---|---|---|---|---|---|---|---|---|---|
| Hue interval | 10[%] | 20[%] | 30[%] | 40[%] | 50[%] | 60[%] | 70[%] | 80[%] | 90[%] |
| R–Y | $\Delta HP_{RY10}$ | $\Delta HP_{RY20}$ | $\Delta HP_{RY30}$ | $\Delta HP_{RY40}$ | $\Delta HP_{RY50}$ | $\Delta HP_{RY60}$ | $\Delta HP_{RY70}$ | $\Delta HP_{RY80}$ | $\Delta HP_{RY90}$ |
| Y–G | $\Delta HP_{YG10}$ | $\Delta HP_{YG20}$ | $\Delta HP_{YG30}$ | $\Delta HP_{YG40}$ | $\Delta HP_{YG50}$ | $\Delta HP_{YG60}$ | $\Delta HP_{YG70}$ | $\Delta HP_{YG80}$ | $\Delta HP_{YG90}$ |
| G–C | $\Delta HP_{GC10}$ | $\Delta HP_{GC20}$ | $\Delta HP_{GC30}$ | $\Delta HP_{GC40}$ | $\Delta HP_{GC50}$ | $\Delta HP_{GC60}$ | $\Delta HP_{GC70}$ | $\Delta HP_{GC80}$ | $\Delta HP_{GC90}$ |
| C–B | $\Delta HP_{CB10}$ | $\Delta HP_{CB20}$ | $\Delta HP_{CB30}$ | $\Delta HP_{CB40}$ | $\Delta HP_{CB50}$ | $\Delta HP_{CB60}$ | $\Delta HP_{CB70}$ | $\Delta HP_{CB80}$ | $\Delta HP_{CB90}$ |
| B–M | $\Delta HP_{BM10}$ | $\Delta HP_{BM20}$ | $\Delta HP_{BM30}$ | $\Delta HP_{BM40}$ | $\Delta HP_{BM50}$ | $\Delta HP_{BM60}$ | $\Delta HP_{BM70}$ | $\Delta HP_{BM80}$ | $\Delta HP_{BM90}$ |
| M–R | $\Delta HP_{MR10}$ | $\Delta HP_{MR20}$ | $\Delta HP_{MR30}$ | $\Delta HP_{MR40}$ | $\Delta HP_{MR50}$ | $\Delta HP_{MR60}$ | $\Delta HP_{MR70}$ | $\Delta HP_{MR80}$ | $\Delta HP_{MR90}$ |

A formula for calculating hue mapping parameters ($HP_{RY}$, $HP_{YG}$, $HP_{GC}$, $HP_{CB}$, $HP_{BM}$, $HP_{MR}$) from given hue difference values ($\Delta H_{RY}$, $\Delta H_{YG}$, $\Delta H_{GC}$, $\Delta H_{CB}$, $\Delta H_{BM}$, $\Delta H_{MR}$) is stored in the hue mapping parameter prediction formula storage unit 22. The same formula ($A^{-1}$, C) as in the first embodiment may be used.

When the operator selects a reference color in the reference color pattern printed by the color printer 51 and enters its number as explained in the second embodiment, the hue difference value readout unit 61 reads the hue difference value corresponding to the selected color from the adjustment color sample hue difference value storage unit 60. After reference colors have been selected for all six adjustment colors, the corresponding hue difference values are sent to the hue mapping parameter calculation unit 23, which calculates the values of the hue mapping parameters ($HP_{RY}$, $HP_{YG}$, $HP_{GC}$, $HP_{CB}$, $HP_{BM}$, $HP_{MR}$) from the hue difference values and the formula stored in the hue mapping parameter prediction formula storage unit 22, as described in the first embodiment.

Next, the operation of the third embodiment will be described.

When the operator activates button k1 on the printing color adjustment image (FIG. 8) to begin the hue mapping parameter adjustment process, the adjustment starting unit 50 sends the color printer 51 a command to have the data stored in the adjustment color sample data storage unit 53 sent to the printing control unit 54 and printed, as described in the second embodiment.

The operator then selects the reference colors having hues closest to the hues of the six adjustment colors displayed in areas AR1 to AR6 of the printing color adjustment image, and enters the numbers of the selected reference colors in the frames fr1. An input processing facility (not shown) in the printer driver 52 processes the entered numbers to generate selected color designation signals ($SN_{RY}$, $SN_{YG}$, $SN_{GC}$, $SN_{CB}$, $SN_{BM}$, $SN_{MR}$), which are supplied to the hue difference value readout unit 61. The hue difference value readout unit 61 reads the six corresponding color difference values (which may be denoted $\Delta H_{RY}$, $\Delta H_{YG}$, $\Delta H_{GC}$, $\Delta H_{CB}$, $\Delta H_{BM}$, $\Delta H_{MR}$) from the adjustment color sample hue difference value storage unit 60. The input processing facility, the adjustment color sample hue difference value storage unit 60, and the hue difference value readout unit 61 thus form an input processing unit that obtains color difference values from the numbers entered by the operator.

The hue mapping parameter calculation unit 23 receives the six color difference values ($\Delta H_{RY}$, $\Delta H_{YG}$, $\Delta H_{GC}$, $\Delta H_{CB}$, $\Delta H_{BM}$, $\Delta H_{MR}$, equivalent to $\Delta H_1$ to $\Delta H_6$ in the first embodiment) from the hue difference value readout unit 61. The hue mapping parameter calculation unit 23 also reads the hue mapping parameter prediction formula ($A^{-1}$, C) from the hue mapping parameter prediction formula storage unit 22, and calculates six hue mapping parameters ($HP_{RY}$, $HP_{YG}$, $HP_{GC}$, $HP_{CB}$, $HP_{BM}$, $HP_{MR}$) as described in the first embodiment.

When the operator activates button k2, the hue mapping parameter calculation unit 23 sends the calculated hue mapping parameters ($HP_{RY}$, $HP_{YG}$, $HP_{GC}$, $HP_{CB}$, $HP_{BM}$, $HP_{MR}$) to the color printer 51, where they are stored in the hue mapping parameter storage unit 55.

Subsequently, when the application program 59 sends printing data to the printing data output unit 58 in the printer driver 52, the printing data output unit 58 sends corresponding RGB color data to the color printer 51. As in the second embodiment, the color matching processing unit 24 in the color printer 51 uses the six hue mapping parameters ($HP_{RY}$, $HP_{YG}$, $HP_{GC}$, $HP_{CB}$, $HP_{BM}$, $HP_{MR}$) stored in the hue mapping parameter storage unit 55 to map the RGB data to CMY data, and the printing control unit 54 directs the printing of a corresponding color image.

To the operator, the third embodiment provides the same advantages as the second embodiment, namely, accurate color mapping without the need to resort to trial and error to adjust the values of the hue mapping parameters ($HP_{RY}$, $HP_{YG}$, $HP_{GC}$, $HP_{CB}$, $HP_{BM}$, $HP_{MR}$).

The present invention is not limited to the preceding embodiments. Various modifications are possible.

To give one example, the reference color pattern may include colors with the same hue but different lightness and chroma values, so that lightness and chroma mapping parameters can also be adjusted according to the selected reference colors.

To give another example, for each adjustment color, the reference color pattern may include, instead of a number of discrete reference colors, a continuous swath of color with gradually varying hue. The selected reference color can be designated in terms of its distance from one end of the swath, preferably indicated by a distance scale printed adjacent to the swath.

Those skilled in the art will recognize that many further modifications are possible. The scope of the invention should accordingly be determined from the appended claims.

What is claimed is:

1. An image processing apparatus for mapping colors reproduced in an input system to colors reproduced in an output system, comprising:
   a reference color output processing unit generating a reference color pattern including colors with hues varying in respective ranges targeted around hues of a plurality of adjustment colors, each range of hues being created by mixing colors in different ratios, and causing the output system to reproduce the reference color pattern;
   an input processing unit for obtaining input values related to hues in the reference color pattern corresponding respectively to the hues of the adjustment colors in the input system;
   a hue mapping parameter determination unit determining hue mapping parameters from said input values; and
   a color matching processing unit executing color conversion from the input system to the output system according to the hue mapping parameters determined by the hue mapping parameter determination unit.

2. The image processing apparatus of claim 1, wherein:
   the input values obtained by the input processing unit designate hues in the reference color pattern; and
   the hue mapping parameter determination unit includes a table of hue mapping parameter values corresponding to different hues in the reference color pattern.

3. The image processing apparatus of claim 1, wherein:
   the input values obtained by the input processing unit designate hue differences between the hues of the adjustment colors and the corresponding hues in the reference color pattern; and
   the hue mapping parameter determination unit stores a formula for calculating the hue mapping parameters from said hue differences.

4. The image processing apparatus of claim 3, further comprising:
   a hue difference value calculation unit converting the adjustment colors from the input system of the output system according to different hue mapping parameter values, and calculating resulting hue difference values; and
   a coefficient calculation unit using said different hue mapping parameter values and said resulting hue difference values to calculate said formula.

5. The image processing apparatus of claim 3, wherein the formula is derived by:
   mapping the adjustment colors according to a plurality of sets of hue mapping parameters;
   taking differences between hues of the adjustment colors before mapping and corresponding hues of the adjustment colors after mapping; and
   determining the formula from the differences and the plurality of set of hue mapping parameters.

6. The image processing apparatus of claim 1, wherein the input processing unit obtains said input values according to a hues selected by a human operator from the reference color pattern as most closely matching the hues of the adjustment colors.

7. The image processing apparatus of claim 1, wherein each of said ranges comprises hues created by mixing two primary colors in different ratios.

8. A method of mapping colors reproduced in an input system to colors reproduced in an output system, comprising:
   reproducing a reference color pattern in the output system, the reference color pattern including colors with hues varying in respective ranges targeted around hues of a plurality of adjustment colors, each range of hues being created by mixing colors in different ratios;
   obtaining input values related to hues in the reference color pattern corresponding respectively to the hues of the adjustment colors in the input system;
   determining hue mapping parameters from a said input values; and
   converting colors from the input system to the output system according to the hue mapping parameters thus determined.

9. The method of claim 8, wherein:
   said input values designate hues in the reference color pattern; and
   said hue mapping parameters are determined from a table of hue mapping parameter values corresponding to different hues in the reference color pattern.

10. The method of claim 8, wherein:
    said input values designate hue differences between the hues of the adjustment colors and the corresponding hues in the reference color pattern; and
    said hue mapping parameters are determined from a formula for calculating the hue mapping parameters from said hue differences.

11. The method of claim 10, further comprising:
    converting the adjustment colors from the input system to the output system according to different hue mapping parameter values;
    calculating resulting hue difference values; and
    using said different hue mapping parameter values and said resulting hue difference values to calculate said formula.

12. The method of claim 10, wherein the formula is derived by:
    mapping the adjustment colors according to a plurality of sets of hue mapping parameters;
    taking differences between hues of the adjustment colors before mapping and corresponding hues of the adjustment colors after mapping; and
    determining the formula from the differences and the plurality of sets of hue mapping parameters.

13. The method of claim 8, wherein obtaining input values further comprises:
    having a human operator select, from the reference color pattern hues most closely matching the hues of the adjustment colors;
    having the human operator enter information corresponding to the selected hues into a computing device coupled to the input system; and
    obtaining said input values from the entered information.

14. The method of claim 8, wherein:
    reproducing said reference color pattern in the output system comprises outputting materials having the colors of said reference color pattern.

15. The method of claim 8, wherein:
    reproducing said reference color pattern in the output system comprises printing said reference color pattern.

16. The method of claim 8, wherein each of said ranges comprises hues created by mixing two primary colors in different ratios.

17. An image processing apparatus for mapping colors reproduced in input system to colors reproduced in a printer, comprising:

a reference color output processing unit generating a reference color pattern including colors with hues varying in respective ranges targeted around hues of a plurality of adjustment colors, each range of hues being created by mixing colors in different ratios, and causing the printer to print the reference color pattern;

an input processing unit for obtaining input values related to hues in the reference color pattern corresponding respectively to the hues of the adjustment colors in the input system;

a hue mapping parameter determination unit determining hue mapping parameters from said input values; and a color matching processing unit executing color conversion from the input system to the printer according to the hue mapping parameters determined by the hue mapping parameter determination unit.

18. The image processing apparatus of claim 17, wherein each of aid ranges comprises hues created by mixing two primary colors in different ratios.

* * * * *